(12) United States Patent  
Delker et al.

(10) Patent No.: US 8,954,041 B1
(45) Date of Patent: *Feb. 10, 2015

(54) SYSTEM AND METHOD FOR ID PLATFORM

(71) Applicant: Sprint Communications Company L.P., Overland Park, KS (US)

(72) Inventors: Jason R. Delker, Olathe, KS (US); Robin D. Katzer, Louisburg, KS (US); Sei Y. Ng, Olathe, KS (US); Carl J. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,053

(22) Filed: Sep. 5, 2013

Related U.S. Application Data

(62) Division of application No. 13/023,486, filed on Feb. 8, 2011, now Pat. No. 8,559,933.

(51) Int. Cl.
*H04M 3/42* (2006.01)
*H04W 8/22* (2009.01)

(52) U.S. Cl.
CPC ........................................ *H04W 8/22* (2013.01)
USPC .................... 455/414.1; 455/412.1; 455/410; 455/418; 455/420; 455/407; 455/408; 705/14.53; 705/14.64; 705/14.66; 705/14.49; 705/14.73; 709/204; 709/205; 709/221; 709/231

(58) Field of Classification Search
USPC ................. 455/412, 411, 413, 437, 418, 410, 455/412.1, 420, 414.1; 705/26.35, 35, 26.1, 705/14.45, 14.17, 14.53, 14.64, 14.66, 705/14.49, 14.73; 710/8; 726/29; 370/338, 370/328; 707/803; 709/204, 205, 221, 225, 709/231

See application file for complete search history.

(56) References Cited

U.S. PATENT DOCUMENTS

| | | | |
|---|---|---|---|
| 5,950,200 A * | 9/1999 | Sudai et al. | ............................ 1/1 |
| 6,064,975 A | 5/2000 | Moon et al. | |
| 6,186,553 B1 | 2/2001 | Phillips et al. | |

(Continued)

FOREIGN PATENT DOCUMENTS

| | | |
|---|---|---|
| WO | 2009056148 A1 | 5/2009 |
| WO | 2014022446 A1 | 2/2014 |

OTHER PUBLICATIONS

Ackerman, Samuel K., "Lecture Slides: Mapping User Interface Design to Culture Dimensions", Aaron Marcus and Associates, Inc., 2001.

(Continued)

*Primary Examiner* — Fred Casca

(57) ABSTRACT

A system is provided. The system comprises a processor, a memory coupled to the processor, and an application stored in the memory. When executed by the processor, the application receives a plurality of first messages from a first plurality of handsets, each of the first messages indicating that one of the first plurality of handsets has installed a first ID, wherein the first ID is associated with a first ID provider, receives a second message from the first ID provider, the second message indicating that new content associated with the first ID is available, and in response to the second message, transmits a plurality of third messages, each of the third messages directed to one of the first plurality of handsets, indicating that new content associated with the first ID is available.

12 Claims, 5 Drawing Sheets

(56) References Cited

U.S. PATENT DOCUMENTS

| | | |
|---|---|---|
| 6,356,838 B1 | 3/2002 | Paul |
| 6,622,016 B1 | 9/2003 | Sladek et al. |
| 6,647,260 B2 | 11/2003 | Dusse et al. |
| 6,978,132 B1 | 12/2005 | Sladek et al. |
| 6,986,107 B2 | 1/2006 | Hanggie et al. |
| 7,031,437 B1 | 4/2006 | Parsons et al. |
| 7,072,653 B1 | 7/2006 | Sladek et al. |
| 7,073,130 B2 | 7/2006 | Novak et al. |
| 7,215,754 B1 | 5/2007 | Woodson et al. |
| 7,260,382 B1 | 8/2007 | Lamb et al. |
| 7,260,386 B1 | 8/2007 | Haldar et al. |
| 7,500,198 B2 | 3/2009 | Mathews et al. |
| 7,558,953 B2 | 7/2009 | Osthoff et al. |
| 7,702,322 B1 | 4/2010 | Maurya et al. |
| 7,930,636 B2 | 4/2011 | Garbow et al. |
| 7,970,386 B2 | 6/2011 | Bhat et al. |
| 8,012,219 B2 | 9/2011 | Mendez et al. |
| 8,150,962 B1 | 4/2012 | Wolter |
| 8,244,277 B1 | 8/2012 | Cha et al. |
| 8,265,658 B2 | 9/2012 | Issa et al. |
| 8,270,310 B2 | 9/2012 | Raleigh |
| 8,270,941 B2 | 9/2012 | Kenagy et al. |
| 8,315,198 B2 | 11/2012 | Corneille et al. |
| 8,359,016 B2 | 1/2013 | Lindeman et al. |
| 8,533,605 B1 | 9/2013 | Cha et al. |
| 8,538,398 B2 | 9/2013 | Wilson et al. |
| 8,559,933 B1 | 10/2013 | Delker et al. |
| 8,577,334 B1 | 11/2013 | Smith et al. |
| 8,583,091 B1 | 11/2013 | Delker et al. |
| 8,589,911 B1 | 11/2013 | Sharkey et al. |
| 8,838,087 B1 | 9/2014 | Delker et al. |
| 8,843,122 B1 | 9/2014 | Wick et al. |
| 2002/0029169 A1 | 3/2002 | Oki et al. |
| 2002/0054086 A1 | 5/2002 | Van Oostenbrugge et al. |
| 2002/0054150 A1 | 5/2002 | I'Anson et al. |
| 2002/0101444 A1 | 8/2002 | Novak et al. |
| 2002/0123335 A1 | 9/2002 | Luna et al. |
| 2002/0142760 A1 | 10/2002 | Gidron et al. |
| 2002/0167542 A1 | 11/2002 | Florin |
| 2003/0233329 A1 | 12/2003 | Laraki et al. |
| 2004/0044752 A1 | 3/2004 | Hamaguchi et al. |
| 2004/0171375 A1 | 9/2004 | Chow-Toun |
| 2004/0179034 A1 | 9/2004 | Burritt |
| 2004/0181678 A1 | 9/2004 | Lee et al. |
| 2004/0203941 A1 | 10/2004 | Kaplan et al. |
| 2004/0216054 A1 | 10/2004 | Mathews et al. |
| 2005/0050474 A1 | 3/2005 | Bells et al. |
| 2005/0071780 A1 | 3/2005 | Muller et al. |
| 2005/0085272 A1 | 4/2005 | Anderson et al. |
| 2006/0048141 A1 | 3/2006 | Persson et al. |
| 2006/0085751 A1 | 4/2006 | O'Brien et al. |
| 2006/0092861 A1 | 5/2006 | Corday et al. |
| 2006/0190569 A1 | 8/2006 | Neil et al. |
| 2006/0258289 A1 | 11/2006 | Dua |
| 2006/0277469 A1 | 12/2006 | Chaudhri et al. |
| 2007/0067738 A1 | 3/2007 | Flynt et al. |
| 2007/0088851 A1 | 4/2007 | Levkovitz et al. |
| 2007/0109580 A1 | 5/2007 | Yoshida |
| 2007/0130156 A1 | 6/2007 | Tenhunen et al. |
| 2007/0265023 A1 | 11/2007 | Bengtsson et al. |
| 2007/0268842 A1 | 11/2007 | Wang |
| 2007/0282914 A1 | 12/2007 | Sivapragasam et al. |
| 2008/0010133 A1 | 1/2008 | Pyhalammi et al. |
| 2008/0034309 A1 | 2/2008 | Louch et al. |
| 2008/0092057 A1 | 4/2008 | Monson et al. |
| 2008/0192714 A1 | 8/2008 | Kim et al. |
| 2008/0214172 A1 | 9/2008 | Anwer |
| 2008/0276182 A1 | 11/2008 | Leow |
| 2008/0305775 A1 | 12/2008 | Aaltonen et al. |
| 2008/0319887 A1 | 12/2008 | Pizzi et al. |
| 2009/0017870 A1 | 1/2009 | An |
| 2009/0077495 A1 | 3/2009 | Bhat et al. |
| 2009/0181716 A1 | 7/2009 | Benco et al. |
| 2009/0186651 A1* | 7/2009 | You .......................... 455/552.1 |
| 2009/0228824 A1 | 9/2009 | Forstall et al. |
| 2009/0254753 A1 | 10/2009 | De Atley et al. |
| 2009/0260004 A1 | 10/2009 | Datta et al. |
| 2009/0291674 A1 | 11/2009 | Choi |
| 2009/0307679 A1 | 12/2009 | Lee et al. |
| 2010/0005196 A1 | 1/2010 | Wolff-Petersen |
| 2010/0030901 A1 | 2/2010 | Hallberg et al. |
| 2010/0060549 A1 | 3/2010 | Tsern |
| 2010/0087175 A1 | 4/2010 | Roundtree |
| 2010/0115438 A1 | 5/2010 | Chu |
| 2010/0184422 A1 | 7/2010 | Ahrens |
| 2010/0190478 A1 | 7/2010 | Brewer et al. |
| 2010/0197219 A1 | 8/2010 | Issa et al. |
| 2010/0234051 A1 | 9/2010 | Holden et al. |
| 2010/0281427 A1 | 11/2010 | Ghosh et al. |
| 2011/0072121 A1* | 3/2011 | Takasugi et al. .............. 709/222 |
| 2011/0161149 A1* | 6/2011 | Kaplan ..................... 705/14.17 |
| 2011/0210933 A1 | 9/2011 | Forstall |
| 2011/0238496 A1 | 9/2011 | Gurbuxani et al. |
| 2011/0295980 A1 | 12/2011 | Aldis et al. |
| 2011/0314389 A1 | 12/2011 | Meredith et al. |
| 2012/0016735 A1 | 1/2012 | Park et al. |
| 2012/0102428 A1 | 4/2012 | Stewart |
| 2012/0102547 A1 | 4/2012 | Fransdonk |
| 2012/0117478 A1 | 5/2012 | Vadde et al. |
| 2012/0155292 A1 | 6/2012 | Zazula et al. |
| 2013/0097654 A1 | 4/2013 | Aciicmez et al. |
| 2013/0275915 A1 | 10/2013 | Wang |
| 2014/0036697 A1 | 2/2014 | Annan et al. |
| 2014/0047559 A1 | 2/2014 | Vera et al. |
| 2014/0127662 A1 | 5/2014 | Kron et al. |
| 2014/0173462 A1 | 6/2014 | Mattingly et al. |

OTHER PUBLICATIONS

Hollister, Sean, "Apple patent app hints at iPod-based phones, Peel 520 turns shades of green, red, blue and yellow," Engadget, http://www.engadget.com/2010/09/19/apple-patent-app-hints-at-ipod-based-phones-peel-520-turns-shad/, Sep. 19, 2010, p. 1.

Kenja's Newsletter, About Newsletter, http://kenja.net/news.main.html, printed from the World Wide Web, "last modified Fri, Oct. 10, 2003".

Openwave, "Comparison of WAP Push and Short Message Service (SMS)," Openwave Systems, Inc., Redwood City, CA, Apr. 2002.

Qualcomm, uiOne™, http://brew.qualcomm.com/brew/in/about/uione.html.

Scansoft press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.

Stanford Technology Ventures Program, "Danger, Inc.: Powering the Next Generation of Mobile Technology", Oct. 15, 2003.

Foreign Communication From a Related Counterpart Application—International Search Report and Written Opinion, PCT/US2013/052805 Oct. 4, 2013.

Pre-Interview Communication dated Apr. 24, 2012, U.S. Appl. No. 12/876,220, filed Sep. 6, 2010.

Pre-Interview Communication dated Feb. 26, 2013, U.S. Appl. No. 13/023,486, filed Feb. 8, 2011.

Notice of Allowance dated Jun. 4, 2013, U.S. Appl. No. 13/023,486, filed Feb. 8, 2011.

Office Action—Restriction Requirement dated Feb. 1, 2012, U.S. Appl. No. 12/876,221, filed Sep. 6, 2010.

Office Action dated May 10, 2012, U.S. Appl. No. 12/876,221, filed Sep. 6, 2010.

Final Office Action dated Jan. 11, 2013, U.S. Appl. No. 12/876,221, filed Sep. 6, 2010.

Advisory Action dated Apr. 23, 2013, U.S. Appl. No. 12/876,221, filed Sep. 6, 2010.

Notice of Allowance dated Jul. 2, 2013, U.S. Appl. No. 12/876,221, filed Sep. 6, 2010.

Pre-Interview Communication dated Jul. 19, 2012, U.S. Appl. No. 13/018,083, filed Jan. 31, 2011.

Final Office Action dated May 10, 2013, U.S. Appl. No. 13/018,083, filed Jan. 31, 2011.

(56) References Cited

OTHER PUBLICATIONS

Advisory Action dated Aug. 6, 2013, U.S. Appl. No. 13/018,083, filed Jan. 31, 2011.
Pre-Interview Communication dated Feb. 26, 2013, U.S. Appl. No. 13/118,058, filed May 27, 2011.
First Action Interview Office Action dated May 6, 2013, U.S. Appl. No. 13/118,058, filed May 27, 2011.
Final Office Action dated Sep. 10, 2013, U.S. Appl. No. 13/118,058, filed May 27, 2011.
Notice of Allowance dated Mar. 30, 2012, U.S. Appl. No. 13/029,103, filed Feb. 16, 2011.
Notice of Allowance dated Apr. 29, 2013, U.S. Appl. No. 13/537,563, filed Jun. 29, 2012.
Office Action dated Mar. 14, 2013, U.S. Appl. No. 13/161,496, filed Jun. 16, 2011.
Notice of Allowance dated Jun. 27, 2013, U.S. Appl. No. 13/161,496, filed Jun. 16, 2011.
Office Action—Restriction Requirement dated Aug. 26, 2013, U.S. Appl. No. 13/031,123, filed Feb. 8, 2011.
Office Action dated Apr. 15, 2008, U.S. Appl. No. 11/046,083, filed Jan. 28, 2005.
Final Office Action dated Oct. 28, 2008, U.S. Appl. No. 11/046,083, filed Jan. 28, 2005.
Office Action dated Aug. 15, 2011, U.S. Appl. No. 12/330,759, filed Dec. 9, 2008.
Office Action dated Apr. 3, 2008, U.S. Appl. No. 11/333,964, filed Jan. 17, 2006.
Final Office Action dated Oct. 8, 2008, U.S. Appl. No. 11/333,964, filed Jan. 17, 2006.
Final Office Action dated Jan. 21, 2008, U.S. Appl. No. 11/333,964, filed Jan. 17, 2006.
Advisory Action dated Apr. 13, 2008, U.S. Appl. No. 11/333,964, filed Jan. 17, 2006.
Office Action dated Jun. 23, 2009, U.S. Appl. No. 11/333,964, filed Jan. 17, 2006.
Final Office Action dated May 11, 2010, U.S. Appl. No. 11/333,964, filed Jan. 17, 2006.
Advisory Action dated Jul. 22, 2010, U.S. Appl. No. 11/333,964, filed Jan. 17, 2006.
Wolter, Eric, Patent Application entitled "Method and System for Calendar-Based Delivery of Themed User-Interface Skins," filed Dec. 9, 2008, U.S. Appl. No. 12/330,759.
Delker, Jason R., et al., Patent Application entitled "Provisioning System and Methods for Interfaceless Phone," filed Sep. 6, 2010, U.S. Appl. No. 12/876,220.
Delker, Jason R., et al., Patent Application entitled "Dynamic Loading, Unloading, and Caching of Alternate Complete Interfaces," filed Sep. 30, 2013, U.S. Appl. No. 14/042,707.
Delker, Jason R., et al., Patent Application entitled "Shared ID with Second Party," filed Jan. 31, 2011, U.S. Appl. No. 13/018,083.
Delker, Jason R., et al., Patent Application entitled "Extending ID to a Computer System," filed May 27, 2011, U.S. Appl. No. 13/118,058.
Davis, John M., et al., Patent Application entitled "Mirroring Device Interface Components for Content Sharing," filed Mar. 10, 2011, U.S. Appl. No. 13/045,292.
Annan, Brandon C., et al., Patent Application entitled, "Traffic Management of Third Party Applications", filed Jul. 31, 2012, U.S. Appl. No. 13/536,709.
Annan, Brandon C., et al., International Application entitled, "Traffic Management of Third Party Applications", filed Jul. 24, 2013, Serial No. PCT/US13/52805.
Katzer, Robin Dale, et al., Patent Application entitled "Zone Architecture for Dynamic Targeted Content Creation," filed Oct. 11, 2011, U.S. Appl. No. 13/271,207.
Delker, Jason R., et al., Patent Application entitled "Transition Experience During Loading and Updating an Interface and Applications Pack," filed Oct. 24, 2012, U.S. Appl. No. 13/659,889.
Delker, Jason R., et al., Patent Application entitled "Ad Sponsored Communication Pack," filed Feb. 18, 2011, U.S. Appl. No. 13/031,123.
FAIPP Office Action dated Jan. 24, 2014, U.S. Appl. No. 12/876,220, filed Sep. 6, 2010.
Office Action dated Dec. 26, 2013, U.S. Appl. No. 13/018,083, filed Jan. 31, 2011.
Advisory Action dated Nov. 22, 2013, U.S. Appl. No. 13/118,058, filed May 27, 2011.
Office Action dated Dec. 17, 2013, U.S. Appl. No. 13/031,123, filed Feb. 18, 2011.
Final Office Action dated Mar. 20, 2014, U.S. Appl. No. 12/876,220, filed Sep. 6, 2010.
Notice of Allowance dated May 6, 2014, U.S. Appl. No. 12/876,220, filed Sep. 6, 2010.
Final Office Action dated Apr. 3, 2014, U.S. Appl. No. 13/018,083, filed Jan. 31, 2011.
Advisory Action dated Jun. 9, 2014, U.S. Appl. No. 13/018,083, filed Jan. 31, 2011.
Office Action dated Mar. 18, 2014, U.S. Appl. No. 13/118,058, filed May 27, 2011.
Pre-Interview Communication dated Jun. 9, 2014, U.S. Appl. No. 13/271,207, filed Oct. 11, 2011.
Pre-Interview Communication dated Mar. 21, 2014, U.S. Appl. No. 13/537,610, filed Jun. 29, 2012.
Notice of Allowance dated May 18, 2014, U.S. Appl. No. 13/537,610, filed Jun. 29, 2012.
Wick, Ryan A., et al., Patent Application entitled "Mobile Phone Controls Preprocessor" filed Jun. 29, 2012, U.S. Appl. No. 13/537,610.
Office Action dated Sep. 23, 2014, U.S. Appl. No. 13/018,083, filed Jan. 31, 2011.
Notice of Allowance dated Oct. 22, 2014, U.S. Appl. No. 13/118,058, filed May 27, 2011.
Pre-Interview Communication dated Aug. 6, 2014, U.S. Appl. No. 13/045,292, filed Mar. 10, 2011.
First Action Interview Office Action dated Oct. 10, 2014, U.S. Appl. No. 13/045,292, filed Mar. 10, 2011.
Pre-Interview Communication dated Aug. 8, 2014, Application U.S. Appl. No. 13/659,889, filed Oct. 24, 2012.
First Action Interview dated Oct. 15, 2014, U.S. Appl. No. 13/659,889, filed Oct. 24, 2012.
Office Action dated Oct. 10, 2014, U.S. Appl. No. 131031,123, filed Feb. 18, 2011.
Wick, Ryan A., et al., Patent Application entitled "Mobile Phone Controls Preprocessor" filed on Sep. 3, 2014, U.S. Appl. No. 14/476,339.

\* cited by examiner

SYSTEM AND METHOD FOR ID PLATFORM

CROSS-REFERENCE TO RELATED APPLICATIONS

This application is a divisional of and claims priority under 35 U.S.C. §120 to U.S. patent application Ser. No. 13/023,486, filed on Feb. 8, 2011, entitled, "System and Method for ID Platform" which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. Wallpapers, themes, and branding are installed on the mobile phones by the original equipment manufacturers in the firmware delivered on the mobile phones. Mobile phone users are able to customize elements of their device by installing new wallpapers and themes.

SUMMARY

In an embodiment, a system is disclosed. The system is comprised of a processor, a memory, and an application stored in memory. When executed by the processor, the application receives a plurality of first messages from a first plurality of handsets, each of the first messages indicating that one of the first plurality of handsets has installed a first ID. The first ID is associated with a first ID provider. The application may then receive a second message from the first ID provider, the second message indicating that new content associated with a first ID is available. In response to the second message, the application transmits a plurality of third messages. Each of the third messages is directed to one of the first plurality of handsets, indicating that new content associated with the first ID is available.

In an embodiment, a method is disclosed. The method comprises receiving a first message from a first handset, where the first message indicates that the first handset has installed a first ID. In response to receiving the first message, the first handset is associated with a first ID. A second message may then be received from the first handset, where the second message indicates the first handset has installed a second ID. In response to receiving the second message, the first handset is associated with a second ID. A third message may then be received from a second handset, where the third message indicates that the second handset has installed the second ID. In response to receiving the third message, the second handset is associated with the second ID. Associating different handsets with different IDs defines different content partitions. When new content associated with IDs is available, notification is delivered to the first and second handset differentially based on the content partitions.

In an embodiment, a portable electronic device is disclosed. The device comprises a radio transceiver, a processor, a memory which comprises a system partition, an ID installer application stored in the system partition of the memory, and an ID zone application stored in the system partition of the memory. When executed by the processor, the ID installer application may receive a control input to install an ID. Upon receiving the control input, the ID installer application wirelessly downloads the ID via the radio transceiver and stores the ID in the memory outside of the system partition. The ID installer application periodically transmits a message wirelessly via the radio transceiver identifying any IDs stored in the memory. When executed by the processor, the ID zone application wirelessly transmits a request to retrieve ID content via the radio transceiver.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
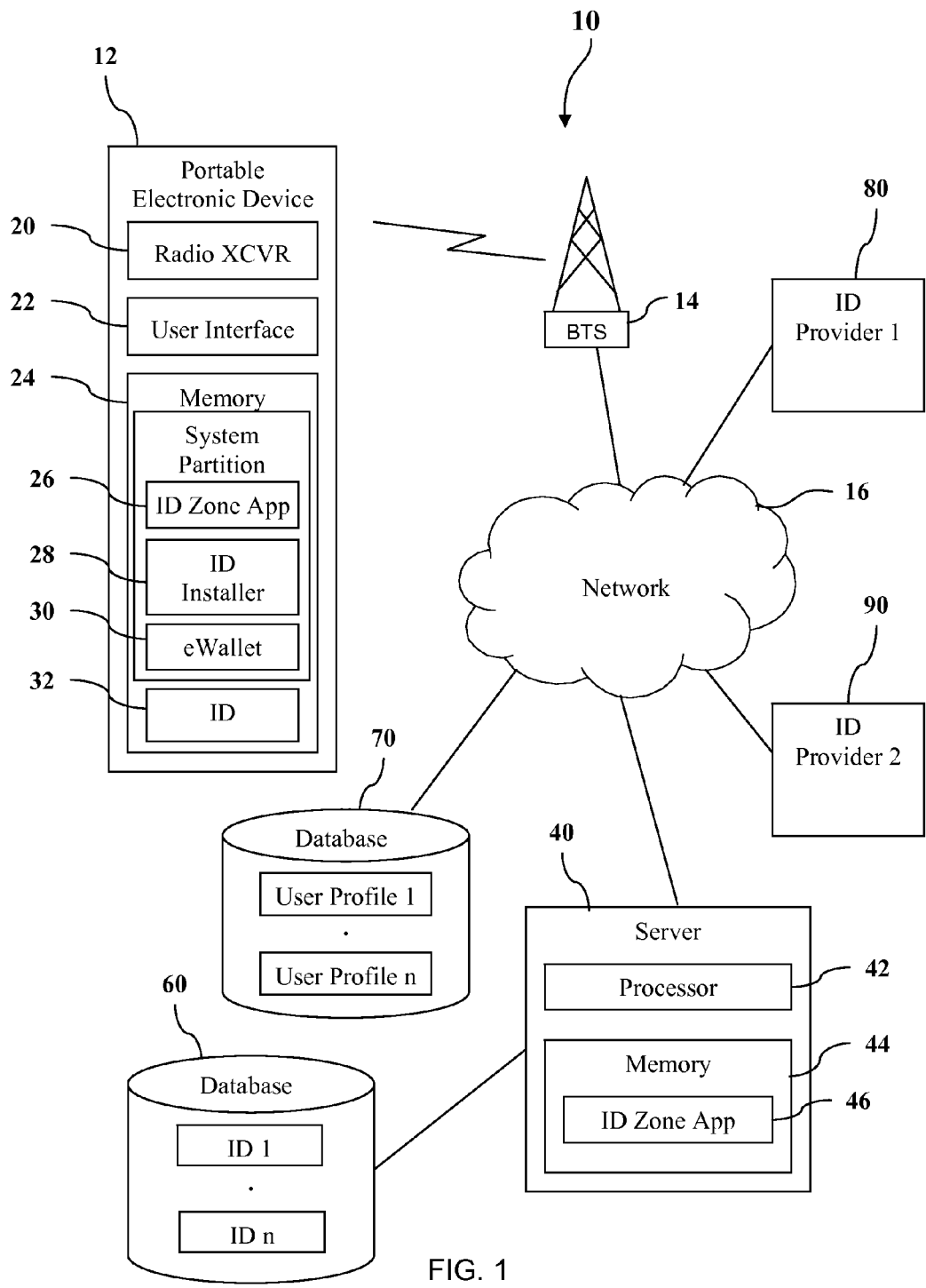
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method for providing enhanced interaction between a portable electronic device user and an ID provider is described. The interaction between the portable electronic device user and the ID provider is managed by a communications service provider associated with the portable electronic device. A portable electronic device user may have the ability to install IDs. An ID comprises at least one of an application, network services, a wallpaper, a media file, a widget, and a screensaver which may be used to provide a custom look and functionality to a portable electronic device. Further, an ID comprises an auto-installation routine or application that automatically manages downloading the several components of the ID onto the portable electronic device, thereby saving the user having to go to a plurality of different locations and download the several components of the ID in a series of distinct transactions. A widget is a small specialized graphical user interface (GUI) application that provides some visual information and easy access to frequently used functions such as clocks, calendars, and news aggregators.

Each ID installed will associate the portable electronic device with targeted content from an ID provider. The service provider, for example a server computer executing an ID server application, may manage this association and manage the messaging and content delivery between the ID provider and the portable electronic device. For example, a user may install an ID for their favorite sports team, a second ID for a professional organization, and a third ID for their local school district. Each ID will download content for display on the device. The user may select an ID, and an ID zone application on the portable electronic device will be executed presenting the content from the selected ID provider. The content may include a customized look and feel to the device as well as information and announcements from the ID provider. The information may be promotional in nature, such as a coupon for a special ticket package to an upcoming game, or an announcement, such as the school holiday schedule. Some of the information may be time based. For example, a message may be sent out to the ID on the portable electronic device by the ID provider via the server computer to provide a reminder that a game associated with the favorite sports team is starting in five minutes.

In addition to the content provided when an ID is installed, the ID provider will be able to add new content and notify the service provider that new content is available. The service provider may then send messages specifically to portable electronic devices having the ID installed. The ID zone application on the portable electronic device may receive the messages and present a notification to the user that new content is available, drawing the device user into the target ID zone application to immediately access the content. Alternatively, the user may dismiss the notification, and the content may be presented the next time the ID zone application activates the subject ID. The ID content is controlled by the ID provider for that ID, with the user having the ability to install multiple IDs and switch between IDs to view the content from the associated ID provider.

Because the service provider manages the interaction between the device user and the ID provider, they may also control how often ID providers may send messages. This allows the service provider to control at least some aspects of the user experience for their customers to retain value and prevent overuse. The service provider may assign priority levels to messages and have ID provider policies applied according to priority and ID. For example, priority 1 messages might be reserved for customer care, billing, device performance issues, or emergency announcements and may be unlimited. Priority 2 may be targeted messages sent only to users meeting a specific criteria such as a previous purchase, while priority 3 may be broadcast messages sent to all users with an ID installed and may be limited to 1 or 2 messages a day. In this manner the service provider may ensure that the IDs remain a valuable feature of the device. Alternatively, the ID provider may impose message frequency limitations on itself to preserve the value of their ID among affiliated users.

Turning now to FIG. 1, a communication system 10 is described. The system 10 comprises a portable electronic device 12, a base transceiver station (BTS) 14, a network 16, a server 40, an ID database 60, a user profile database 70, a first ID provider 80, and a second ID provider 90. The portable electronic device 12 may be a mobile phone, a personal digital assistant (PDA), a media player, or other communication enabled portable electronic device. The base transceiver station 14 provides a communication link to the portable electronic device 12 and couples the portable electronic device 12 to the network 16. In an embodiment, the base transceiver station 14 provides a wireless communication link to the portable electronic device 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the communication system 10 may comprise any number of base transceiver stations 14 and any number of portable electronic devices 12. The network 16 may be a public communication network, a private communication network, or a combination thereof.

The portable electronic device 12 may comprise a radio transceiver 20, a user interface 22, and a memory 24. Alternatively, the portable electronic device 12 may comprise two or more radio transceivers 20. The memory 24 may store a client ID zone application 26, an ID installer application 28, and an eWallet application 30 in the system partition, and a plurality of IDs 32 in the user accessible partition. In an embodiment, when executed by a processor (not shown) of the portable electronic device 12, the ID installer application 28 may receive a control input to install an ID 32 and wirelessly download the ID 32 via the radio transceiver 20. The ID installer application 28 may store the ID 32 in the memory 24 outside of a system partition of the memory 24. Additionally, the ID installer application 28 may periodically transmit a message to the server 40 identifying an ID 32 stored in the memory 24. When executed by the processor of the portable electronic device 12, the client ID zone application 26 may wirelessly transmit a request to server 40 to retrieve ID content via the radio transceiver 20. For example, a user may choose to install an ID 32 for their favorite television show. When the user executes the client ID zone application 26 and selects the ID 32 for the television show, a message is sent requesting the latest content from the ID provider 80, such as the broadcast times and show synopsis, to be presented to the user.

In an embodiment, the client ID zone application 26 may receive ID content and present the ID content in a display of the portable electronic device 12. The presentation may be based on display instructions received with the ID content. The ID provider 80 may send presentation information within the content that controls how the content is displayed to the user. In an embodiment, the ID content may be received as an extensible markup language (XML) file. Extensible markup language provides rules for encoding content and provides representation for data structures, allowing the client ID zone application 26 to understand and properly display the content. In an embodiment, the client ID zone application 26 may further receive a message indicating that new ID content is available. The client ID zone application 26 is a native application installed on the system partition of the portable electronic device 12 as part of the firmware and may not be readily uninstalled. The client ID zone application 26 runs in the background, allowing it to receive messages about new ID content and to present the messages in the notification area of the portable electronic device 12. The messages in the notification area may be presented with custom icons specific to the associated ID provider 80 from which the message was received.

The present disclosure also teaches a server 40 which may comprise a processor 42, a memory 44, and a server ID zone application 46 stored in the memory 44. In an embodiment, when executed by the processor 42, the server ID zone application 46 may receive a plurality of first messages from a first plurality of portable electronic devices 12. In some contexts, the portable electronic device 12 may be referred to as a handset. Each of the first messages indicates that one of the first plurality of portable electronic devices 12 has installed a first ID 32, where the first ID 32 is associated with a first ID provider 80. The server ID zone application 46 may also receive a second message from the first ID provider 80, the second message indicating that new content associated with a first ID is available. In response to the second message, the server ID zone application 46 may transmit a plurality of third messages, each of the third messages directed to the first plurality of portable electronic devices 12, indicating that new content associated with the first ID is available. The server ID zone application 46 is the relay between the ID provider and the portable electronic devices 12, controlling the communications between the parties. In an embodiment, each of the plurality of third messages is transmitted as an internet protocol (IP) message, where the internet protocol message may not be associated with any higher layer communication application, other than the ID zone application 46. One skilled in the art would recognize a difference between the ID zone application 46 transmitting internet protocol messages to communicate with the ID 32 and/or the portable electronic devices 12 and a generic communication application that uses internet protocol messages as an underlying communication layer. The generic communication application, for example electronic mail, provides a variety of services and functionality and entails a substantial body of code to support these services that are not germane to the ID zone application 46 and would unnecessarily bloat the code and function of the ID zone application 46. Prior text messaging systems in mobile communications utilized short message service (SMS). Short message service messages may require a short message service center to deliver the messages, adding to the cost of sending messages. Using internet protocol messages may simplify the process and reduce the cost to service providers.

In an embodiment, the server ID zone application 46 further receives a fourth message from the first ID provider 80, where the fourth message comprises the new content. The new content may be stored by the server ID zone application 46 in the ID database 60, in the partition of the ID database 60 associated with the first ID. The ID database 60 may be partitioned based on different IDs. A portable electronic device 12 may install multiple IDs 32 and periodically inform the server ID zone application 46 of the IDs 32 that are installed. Alternatively, the portable electronic device 12 may inform the server ID zone application 46 on the event of installing and/or activating an ID 32. Alternatively, the portable electronic device 12 may monitor which IDs 32 are installed and over what intervals of time and/or for what durations of time the several IDs 32 were active, summarize this information in a report, and send the report periodically to the server ID zone application 46. The server ID zone application 46 may handle the association between one or more IDs 32, the portable electronic devices 12 on which they are installed, and the ID providers 80 and content related to each ID 32. This allows the service provider to prevent the content provider from seeing their subscribers directly, as well as allowing them to leverage their knowledge of their customer to provide additional services. In an embodiment, the server ID zone application 46 may further receive a fifth message from one of the first plurality of portable electronic devices 12 requesting the new content associated with the first ID. In response to the request, the server ID zone application 46 may transmit a sixth message to the portable electronic device 12, where the sixth message comprises the new content. In an embodiment, the new content may comprise an extensible markup language file.

In an embodiment, the server ID zone application 46 may further receive information from at least some of the first plurality of portable electronic devices 12, the information describing a control input associated with the first ID received by the portable electronic device 12. In an embodiment, the second message received by the server ID zone application 46 from the ID provider 80 may further identify criteria, and the third messages may be transmitted selectively to the portable electronic devices 12 based on the criteria. This provides a means for the ID provider 80 to target content to a subset of the portable electronic device 12 based on the criteria, rather than sending it to all portable electronic devices 12 with the ID 32 installed. For example, if the ID provider 80 were a school district they may send a notice of the next school board meeting out to parents' devices (as opposed to students). As further examples, the criteria could be defined to send messages to all the portable electronic devices 12 that have the ID 32 installed; to all the portable electronic devices 12 that have the ID 32 currently active; to all the portable electronic devices 12 that have had the ID 32 active a threshold number of times in the past (although they may or may not currently have the ID 32 active); to all the portable electronic devices 12 that have had the ID 32 active at least a threshold percentage of time over a predefined time interval (although they may or may not currently have the ID 32 active). These are examples, and yet other criteria can be defined for selectively transmitting messages to portable electronic device 12 that have the ID 32 installed.

Figure 2:
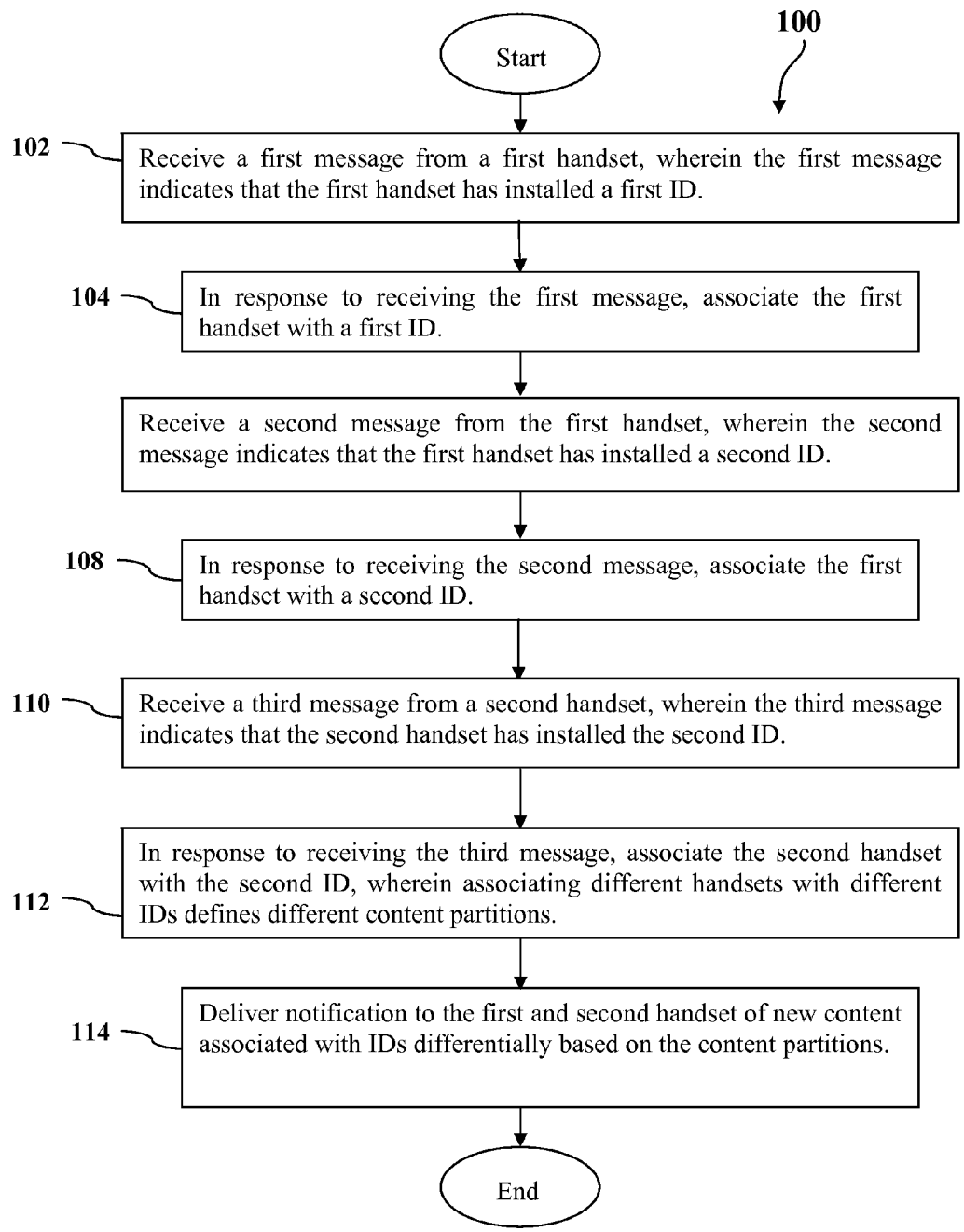
FIG. 2 is a flow chart of a method according to an embodiment of the disclosure.

Turning now to FIG. 2, a method 100 is described. At block 102 a first message is received from a first portable electronic device 12. The first message indicates that the first portable electronic device 12 has installed a first ID 32. At block 104, in response to receiving the first message, the first portable electronic device 12 is associated with the first ID, for example by an entry is made in the ID database 60 that associates the first portable electronic device 12 with the first ID. This association will allow the server ID zone application 46 to be aware of which content and updates should be sent to the first portable electronic device 12. At block 106 a second message is received from the first portable electronic device 12. The second message indicates that the first portable electronic device 12 has installed a second ID 32. At block 108, in response to receiving the second message, the first portable electronic device 12 is associated with a second ID, for example an entry is made in the ID database 60 that associates the first portable electronic device 12 with the second ID. Similar to the first ID, the server ID application 46 will now be aware that content and updates from the second ID should also be sent to the first portable electronic device 12. At block 110 a third message is received from a second portable electronic device 12. The third message indicates that the second portable electronic device 12 has installed the second ID 32. At block 112, in response to receiving the third message, the second portable electronic device 12 is associated with the second ID, where associating different portable electronic devices 12 with different IDs may define different content partitions. Each ID may be associated with a different content partition on the service provider database 60 where the content is stored. At block 114 notification of new content associated with the IDs is delivered to the first and second portable electronic device 12 differentially based on the content partitions. As new content is received for each content partition, notification will be delivered to the first and second portable electronic device 12 associated with the related IDs.

In an embodiment, the method further comprises receiving a fourth message from a first ID provider 80, where the first ID provider 80 is associated with the first ID. The fourth message indicates that new content associated with the first ID is available. In response to receiving the fourth message, a fifth message is transmitted to the first portable electronic device 12, indicating that new content associated with the first ID is available. A sixth message is received from a second ID provider 90, where the second ID provider 90 is associated with the second ID. The sixth message indicates that new content associated with the second ID is available. In response to receiving the sixth message, a seventh message is transmitted to the first portable electronic device 12, and an eighth message is transmitted to the second portable electronic device 12. Both the seventh and eighth messages indicate that new content associated with the second ID is available. Because only the first portable electronic device 12 installed the first ID 32, if new content associated with the first ID is received, notification of the new content is sent to the first portable electronic device 12 only. Both the first and second portable electronic devices 12 installed the second ID 32, so if new content associated with the second ID is received, notification of the new content will be sent to both the first and second portable electronic devices 12. In an embodiment, the fifth message, the seventh message, and the eighth message are transmitted in internet protocol messages.

In an embodiment, the method further describes receiving feedback from the second portable electronic device 12, where the feedback characterizes interaction of the second portable electronic device 12 with the second ID. A ninth message is received from the second ID provider 90 comprising targeted content associated with the second ID and a criteria. Based on the feedback, it is determined that the second portable electronic device 12 meets the criteria, and a tenth message is selectively transmitted to the second portable electronic device 12 and not to the first portable electronic device 12, where the tenth message indicates that targeted content associated with the second ID is available. The ID zone application 26 captures user behavior history and sends feedback to the server 40. This history may comprise information about IDs that have been installed on the portable electronic device 12. This history may comprise information about activations of IDs on the portable electronic device 12. The history may comprise user reactions to ID zone notifications, whether ID zone notifications led to purchases, where the user navigated to ID zone content, and other statistics that may be acquired about the usage of the ID zone application 26. In this embodiment, the server 40 may serve as a customer intelligence platform, collecting the feedback from the plurality of portable electronic devices 12 and abstracting out statistics about the IDs which may be sold to ID providers 80 to allow targeting messages and content based on the feedback analysis. For example, through an eWallet application 30 on the portable electronic device 12, the server 40 will have knowledge that the customer purchased a ringtone through an offer on the second ID. When a new song by the same artist comes out, the second ID provider 90 may send a special offer only to customers who previously purchased a ringtone by the artist. The server 40 may be able to tie together purchases, previous message responses, and promotions to offer a better user experience. The server 40 may be able to track user activity on and user activity initiated through the portable electronic device 12, activity related to the ID and/or activity using the portable electronic device 12 more generally, and to integrate this knowledge into interacting with the portable electronic device 12—for example by sending commercial promotions, for sending public service information, and other valuable information to the portable electronic device 12 and/or to the ID.

In an embodiment, the method 100 further comprises receiving a request for new content associated with an ID and transmitting a message comprising the new content, where the new content is defined in an extensible markup language file. In an embodiment, the extensible markup language file defines ID content and a presentation style of the ID content. In an embodiment, the extensible markup language file is received from an ID provider 80. The extensible markup language provides a structure to the data, allowing the ID provider 80 to actively manage the content and presentation of the ID on a regular basis. This enables the ID provider 80 to keep the content fresh to keep the customer interested to keep using the ID 32. The ID provider 80 can use the ID to provide applications, network services, wallpapers, media files, widgets, and screensavers to the customer to further customize the ID and the portable electronic device 12.

In an embodiment, the method further comprises receiving an eleventh message from the second ID provider 90 comprising targeted content associated with the second ID and a criteria. Based on a user profile associated with the second portable electronic device 12, it is determined that the second portable electronic device 12 meets the criteria. Based on a user profile stored in the user profile database 70 and associated with the first portable electronic device 12, it is determined that the first portable electronic device 12 does not meet the criteria. A twelfth message is selectively transmitted to the second portable electronic device 12 and not to the first portable electronic device 12, where the twelfth message indicates that targeted content associated with the second ID is available. In an embodiment, the user profile comprises at least one of credit score, age, place of residence, marital status, number of children, educational level, income level, purchase history, personal interest, and political affiliation. Further, the user profile may include information about user interactions with the portable electronic device 12, with the IDs installed on the handset, or with components of the IDs. For example, if BMW is an ID provider, rather than target all portable electronic devices with their ID 32 installed, they may send a notice of a special test drive opportunity for an upcoming luxury car only to college graduates over 40 with an annual income greater than $100,000. This allows them to target the promotion to the customers most likely to purchase the car.

While the description of above with reference to FIG. 1 and FIG. 2 may sometimes suggest a separation between the role of the ID providers 80, 90 and the role of the service provider, this need not be the case. In the case of large enterprises, the large enterprise may develop the ID 32 themselves. On the other hand, in the case of small enterprises, the enterprise may lack the resources and/or knowledge to develop an ID 32 themselves, and the service provider instead may develop and manage the ID 32 on behalf of the subject enterprise. It is understood that the present disclosure covers both of these different cases. Thus, an ID provider is understood to be the entity that provides the subject ID 32—whether that is the enterprise itself associated with the ID 32 or whether that is the service provider or other party acting on behalf of the enterprise to provide and manage the subject ID 32.

Figure 3:
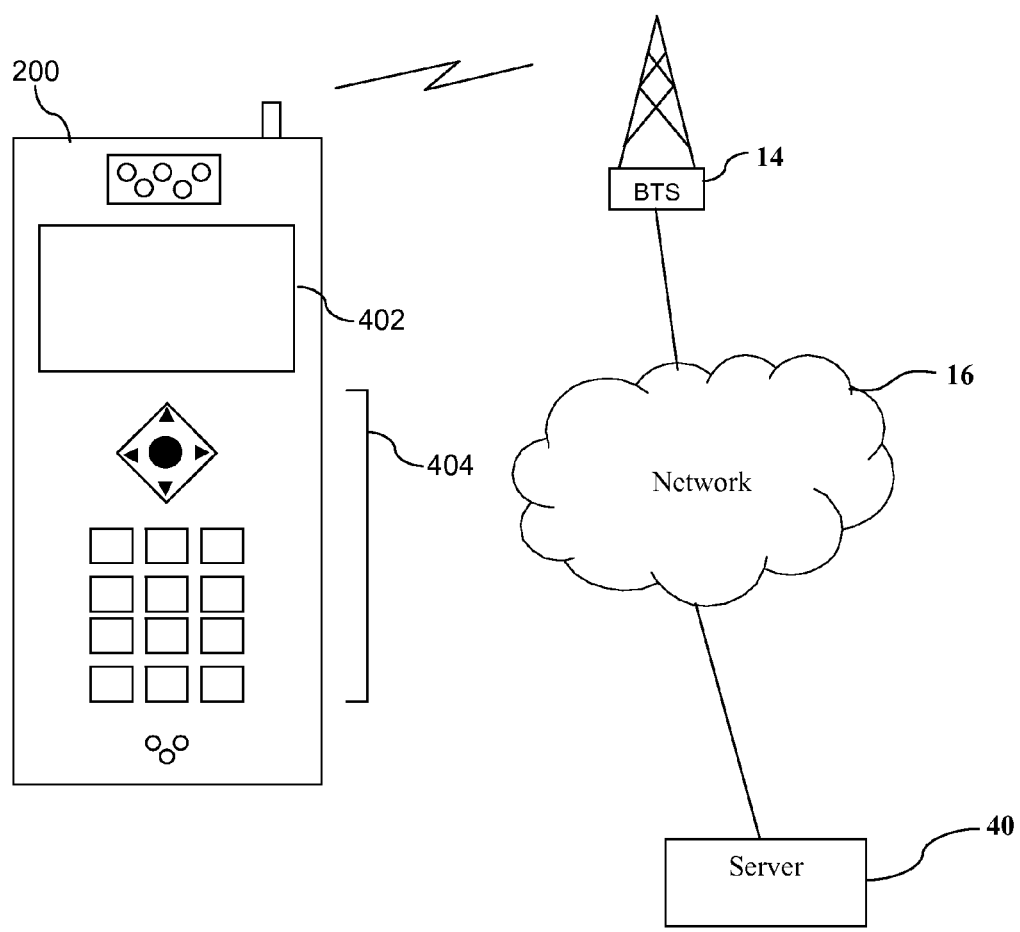
FIG. 3 is an illustration of a mobile device according to an embodiment of the disclosure.

FIG. 3 shows a wireless communications system including the mobile device 200. FIG. 3 depicts the mobile device 200, which is operable for implementing aspects of the present disclosure, but the present disclosure should not be limited to these implementations. Though illustrated as a mobile phone, the mobile device 200 may take various forms including a wireless portable electronic device, a pager, a personal digital assistant (PDA), a gaming device, an inventory control device, a media player, a digital camera, a digital calculator, a portable computer, a tablet computer, a laptop computer, and/or other. Many suitable portable electronic devices combine some or all of these functions. In some embodiments of the present disclosure, the mobile device 200 is not a general purpose computing device like a portable, laptop or tablet computer, but rather is a special-purpose communications device such as a mobile phone, wireless portable electronic device, pager, or PDA. The mobile device 200 may support specialized activities such as gaming, inventory control, job control, and/or task management functions, and so on.

The mobile device 200 includes a display 402 and a touch-sensitive surface and/or keys 404 for input by a user. The mobile device 200 may present options for the user to select, controls for the user to actuate, and/or cursors or other indicators for the user to direct. The mobile device 200 may further accept data entry from the user, including numbers to dial or various parameter values for configuring the operation of the portable electronic device. The mobile device 200 may further execute one or more software or firmware applications in response to user commands. These applications may configure the mobile device 200 to perform various customized functions in response to user interaction. Additionally, the mobile device 200 may be programmed and/or configured over-the-air, for example from a wireless base station, a wireless access point, or a peer mobile device 200.

The mobile device 200 may execute a web browser application which enables the display 402 to show a web page. The web page may be obtained via wireless communications with a base transceiver station (BTS) 14, a wireless network access node, a peer mobile device 200 or any other wireless communication network or system. While a single base transceiver station 14 is illustrated, it is understood that the wireless communication system may comprise additional base transceiver stations. In some instances, the mobile device 200 may be in communication with multiple base transceiver stations 14 at the same time. The base transceiver station 14 (or wireless network access node) is coupled to a wired network 16, such as the Internet. Via the wireless link and the wired network, the mobile device 200 has access to information on various servers, such as a server 40. The server 40 may provide content that may be shown on the display 402. Alternately, the mobile device 200 may access the base transceiver station 14 through a peer mobile device 200 acting as an intermediary, in a relay type or hop type of connection.

Figure 4:
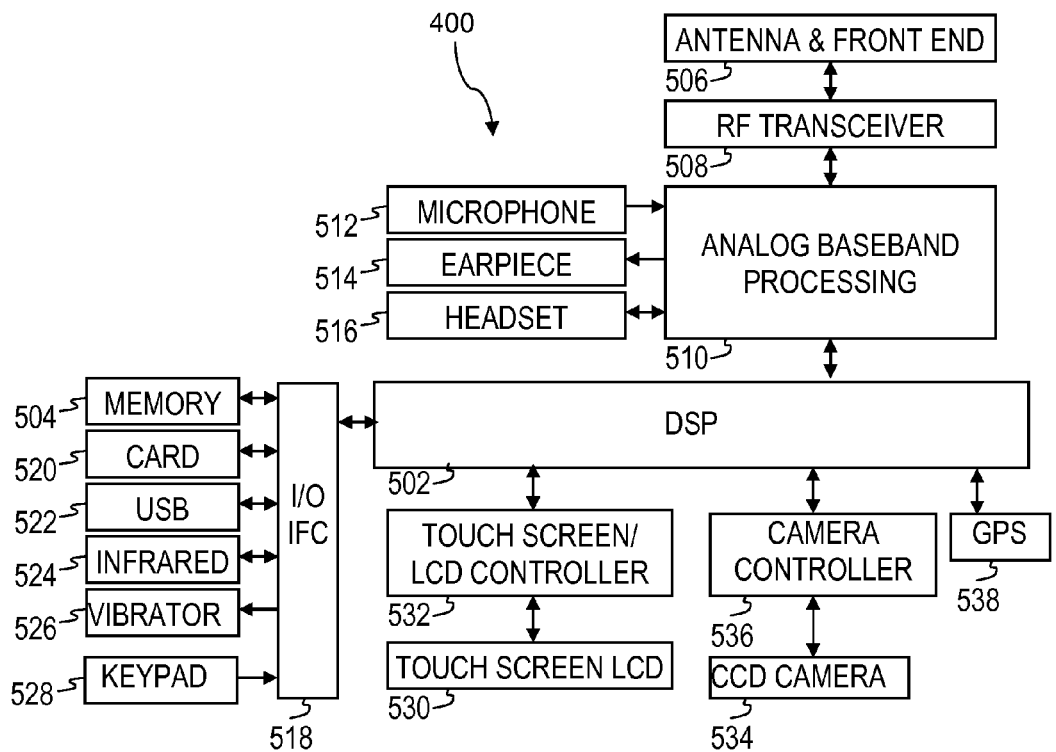
FIG. 4 is a block diagram of a mobile device according to an embodiment of the disclosure.

FIG. 4 shows a block diagram of the mobile device 200. While a variety of known components of portable electronic devices 200 are depicted, in an embodiment a subset of the listed components and/or additional components not listed may be included in the mobile device 200. The mobile device 200 includes a digital signal processor (DSP) 502 and a memory 504. As shown, the mobile device 200 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 200 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 200 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 200 to send and receive information from a radio access network (RAN) or some other available wireless communications network or from a peer mobile device 200. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 200 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 200 to function as a peripheral device to exchange information with a personal computer or other computer system. The infrared port 524 and other optional ports such as a Bluetooth interface or an IEEE 802.11 compliant wireless interface may enable the mobile device 200 to communicate wirelessly with other nearby portable electronic devices and/or wireless base stations.

The input/output interface 518 may further connect the DSP 502 to the vibrator 526 that, when triggered, causes the mobile device 200 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 200. Another input mechanism may be the touch screen LCD 530, which may also display text and/or graphics to the user. The touch screen LCD controller 532 couples the DSP 502 to the touch screen LCD 530.

The CCD camera 534 enables the mobile device 200 to take digital pictures. The DSP 502 communicates with the CCD camera 534 via the camera controller 536. The GPS sensor 538 is coupled to the DSP 502 to decode global positioning system signals, thereby enabling the mobile device 200 to determine its position. In another embodiment, a camera operating according to a technology other than charge coupled device cameras may be employed. Various other peripherals may also be included to provide additional functions, e.g., radio and television reception.

Figure 5:
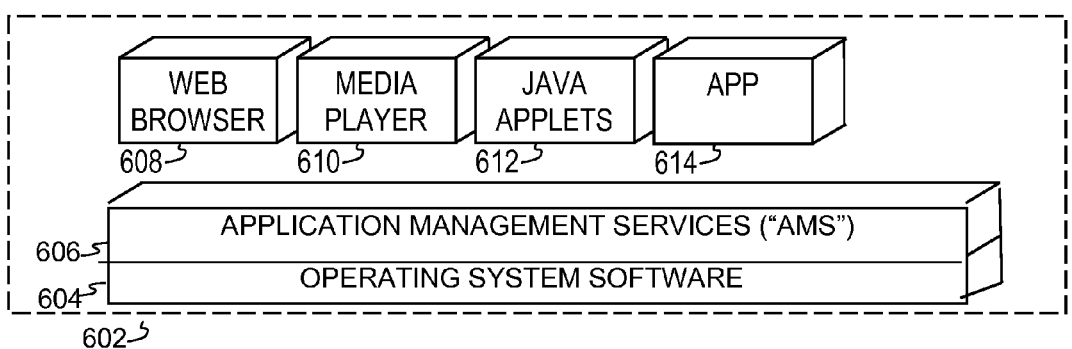
FIG. 5 is a block diagram of a software architecture for a mobile device according to an embodiment of the disclosure.

FIG. 5 illustrates a software environment 602 that may be implemented by the DSP 502. The DSP 502 executes operating system software 604 that provides a platform from which the rest of the software operates. The operating system software 604 may provide a variety of drivers for the portable electronic device hardware with standardized interfaces that are accessible to application software. The operating system software 604 may be coupled to and interact with application management services ("AMS") 606 that transfer control between applications running on the mobile device 200. Also shown in FIG. 5 are a web browser application 608, a media player application 610, and JAVA applets 612. The web browser application 608 configures the mobile device 200 to operate as a web browser, allowing a user to enter information into forms and select links to retrieve and view web pages. The media player application 610 configures the mobile device 200 to retrieve and play audio or audiovisual media. The JAVA applets 612 configure the mobile device 200 to provide games, utilities, and other functionality.

Figure 6:
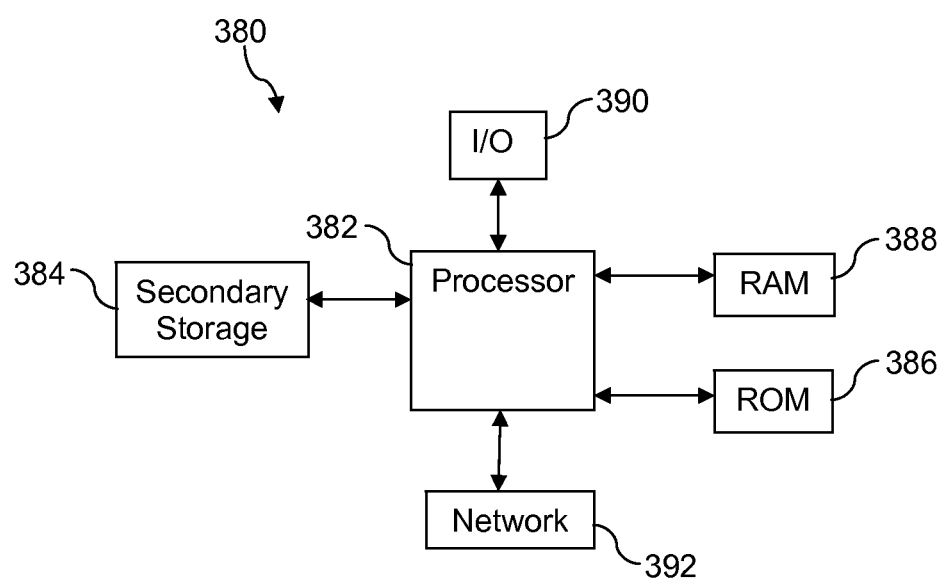
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as non-transitory storage and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data in part by directly accessing the computer program product, for example by reading from a CD-ROM disk inserted into a disk drive peripheral of the computer system 380. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for managing interaction between a plurality of handsets and an ID server having an ID database for storing ID content from one or more ID content providers, comprising:
   receiving, at the ID server, a first ID installation message from a first handset that indicates that the first handset has installed a first ID associated with the display of a first ID content;
   in response to receiving the first ID installation message, associating the first handset with the first ID content in the ID database;
   receiving, at the ID server, a second ID installation message from the first handset that indicates that the first handset has installed a second ID associated with the display of a second ID content;
   in response to receiving the second ID installation message, associating the first handset with the second ID content in the ID database;
   receiving, at the ID server, a third ID installation message from a second handset that indicates that the second handset has installed the second ID associated with the display of the second ID content;
   in response to receiving the third ID installation message, associating the second handset with the second ID content in the ID database, wherein associating the handsets with the ID contents defines content partitions in the ID database of the ID server;
   receiving, at the ID server, a first ID indication message from a first ID provider, wherein the first ID provider is associated with the first ID, and wherein the first ID indication message indicates that new first ID content associated with the first ID is available;
   in response to receiving the first ID indication message, transmitting, by the ID server, a first ID availability message to the first handset, wherein the first ID availability message indicates that the new first ID content associated with the first ID is available;
   receiving, at the ID server, a second ID indication message from a second ID provider, wherein the second ID provider is associated with the second ID, and wherein the second ID indication message indicates that new second ID content associated with the second ID is available;
   in response to receiving the second ID indication message, transmitting, by the ID server, a second ID availability message to the first handset and the second handset, wherein second ID availability message indicates that the new second ID content associated with the second ID is available;
   receiving, at the ID server and storing in the ID database, at least one of the new first ID content or the new second ID content; and
   selectively delivering notification of the at least one of the new first ID content or the new second ID content to at least one of the first handset or the second handset based on the content partitions, wherein at least one of the first ID or the second ID comprises an auto-installation routine and a plurality of a graphical user interface application, another application, and a media file.

2. The method of claim 1, wherein the first ID availability message and the second ID availability message are transmitted in internet protocol (IP) messages.

3. The method of claim 1, further comprising:
   receiving feedback from the second handset, wherein the feedback characterizes interaction of the second handset with the second ID;
   receiving a targeted content message from the second ID provider comprising targeted content associated with the second ID and a criteria;
   based on the feedback, determining that the second handset meets the criteria; and
   transmitting a targeted content availability message selectively to the second handset and not to the first handset, wherein the targeted content availability message indicates that targeted content associated with the second ID is available.

4. The method of claim 1, further comprising:
   receiving a request for new content associated with an ID; and
   transmitting a message comprising the new content, wherein the new content is defined in an extensible markup language file.

5. The method of claim 4, wherein the extensible markup language file defines an ID content and a presentation style of the ID content.

6. The method of claim 4, further comprising receiving the extensible markup language file from an ID provider.

7. The method of claim 1, further comprising:
   receiving a targeted content message from the second ID provider comprising targeted content associated with the second ID and a criteria;
   based on a user profile associated with the second handset, determining that the second handset meets the criteria;
   based on a user profile associated with the first handset, determining that the second handset does not meet the criteria; and
   transmitting a targeted content availability message selectively to the second handset and not to the first handset, wherein the targeted content availability message indicates that targeted content associated with the second ID is available.

8. The method of claim 7, wherein the user profile comprises at least one of credit score, age, place of residence, marital status, number of children, educational level, income level, purchase history, and political affiliation.

9. The method of claim 1, further comprising:
   assigning priority levels to new content messages associated with the first and second IDs; and
   delivering the new content messages to the first and second handsets based on the assigned priority levels.

10. The method of claim 9, wherein the priority levels comprise a priority 1 level, a priority 2 level, and a priority 3 level, wherein the priority 1 level is assigned to any new content messages associated with customer care, billing, device performance issues, or emergency announcements, wherein the priority 2 level is assigned to any new content messages that are targeted messages sent only to users meeting a specific criteria, and wherein the priority 3 level is assigned to any new content messages that are broadcast messages sent to all users with a particular ID installed.

11. The method of claim 10, wherein the priority 1 level new content messages are unlimited, and wherein the priority 3 level new content messages are limited to one or two messages per day.

12. The method of claim 1, wherein the notification of the at least one of the new first ID content or the new second ID content is delivered to the at least one of the first handset or second handset as an internet protocol (IP) message.

\* \* \* \* \*